United States Patent [19]

Kurumida

[11] Patent Number: 5,630,031
[45] Date of Patent: May 13, 1997

[54] HIGH-SPEED DOT MATRIX OUTPUT APPARATUS

[75] Inventor: Tsuneaki Kurumida, Kawasaki, Japan

[73] Assignee: Canon Kabushiki Kaisha, Tokyo, Japan

[21] Appl. No.: 465,910

[22] Filed: Jun. 6, 1995

Related U.S. Application Data

[63] Continuation of Ser. No. 224,191, Apr. 7, 1994, which is a continuation of Ser. No. 908,889, Jul. 7, 1992, abandoned, which is a continuation of Ser. No. 789,401, Oct. 3, 1991, abandoned, which is a continuation of Ser. No. 724,478, Jun. 28, 1991, abandoned, which is a continuation of Ser. No. 342,871, Apr. 25, 1989.

[30] Foreign Application Priority Data

Apr. 28, 1988 [JP] Japan ................. 63-104312

[51] Int. Cl.⁶ ........................... G06K 15/00
[52] U.S. Cl. ........................... 395/115; 395/110
[58] Field of Search ............... 395/110, 112, 395/115, 116, 164, 165, 166, 150; 358/404, 444, 261.4, 296, 298; 400/16, 17, 61, 69, 70–75

[56] References Cited

U.S. PATENT DOCUMENTS

| | | | |
|---|---|---|---|
| 4,488,245 | 12/1984 | Dalke et al. | 364/526 |
| 4,660,998 | 4/1987 | Tsuneki | 400/61 |
| 4,715,006 | 12/1987 | Nagata | 395/110 |
| 4,734,703 | 3/1988 | Sasaki | 364/520 |
| 4,734,707 | 3/1988 | Sasaki | 364/520 |
| 4,837,712 | 6/1989 | Shibamiya | 364/523 |
| 4,881,180 | 11/1989 | Nishiyama | 395/114 |
| 4,901,249 | 2/1990 | Shiota | 364/519 |

FOREIGN PATENT DOCUMENTS

| | | | |
|---|---|---|---|
| 2588212 | 10/1987 | France | 395/110 |
| 3436033 | 4/1985 | Germany | 395/110 |
| 3509206 | 9/1985 | Germany | 395/110 |
| 3633613 | 4/1987 | Germany | G06K 15/00 |
| 3723276 | 2/1988 | Germany | 395/110 |
| 3634185 | 4/1988 | Germany | G06K 15/10 |
| 3912595 | 10/1989 | Germany | 395/110 |
| 2172420 | 9/1986 | United Kingdom | 364/519 |
| 2182471 | 5/1987 | United Kingdom | 395/110 |

OTHER PUBLICATIONS

IBM Technical Disclosure Bulletin, vol. 28, No. 11, Apr. 1986, p. 5003.

*Primary Examiner*—Arthur G. Evans
*Attorney, Agent, or Firm*—Fitzpatrick, Cella, Harper & Scinto

[57] ABSTRACT

An output apparatus having a dot matrix memory and a non-dot-matrix memory, and a method applicable to such an apparatus, in which the dot matrix memory stores an externally entered download font for converting code data into dot matrix data, and in which the non-dot-matrix memory stores non-dot-matrix data for converting code data into non-dot-matrix data and then into dot matrix data. When code is received, the two mentioned memories are controlled so as to have priority in the order: dot matrix memory, then non-dot-matrix memory, to obtain a desired dot pattern in response to the received code data.

64 Claims, 3 Drawing Sheets

HIGH-SPEED DOT MATRIX OUTPUT APPARATUS

This application is a continuation of application Ser. No. 08/224,191 filed Apr. 7, 1994, which is a continuation of application Ser. No. 07/908,889 filed Jul. 7, 1992 abandoned, which is a continuation of application Ser. No. 07/789,401 filed Oct. 3, 1991 abandoned, which is a continuation of application Ser. No. 07/724,478 filed Jun. 28, 1991 abandoned, which is a continuation of application Ser. No. 07/342,871 filed Apr. 25, 1989.

BACKGROUND OF THE INVENTION

1. Field of the Invention

The present invention relates to an output apparatus, and in particularly to an output apparatus for image output using the dot matrix method.

2. Related Background Art

In such apparatus, there have conventionally been employed a method of directly converting code data into dot matrix data, and a method of converting code data into non-dot matrix data such as vector data or run-length data and then converting such data into dot matrix data.

Though the former method can achieve a high-speed conversion, it requires a large memory capacity for storing the dot matrix data. On the other hand, the latter method can reduce the memory capacity but cannot achieve a high-speed conversion. Also, using these methods, it is not easy to increase the kinds of characters employed in printing.

SUMMARY OF THE INVENTION

In consideration of the foregoing, an object of the present invention is to provide an output apparatus of low cost capable of efficient output in dot matrix form.

According to one aspect of the present invention is provided an output apparatus having dot matrix conversion means for converting code data into dot matrix data; auxiliary detachable conversion means for converting code data into dot matrix data; non-dot matrix conversion means for converting code data into non-dot matrix data and then into dot matrix data; and conversion control means for referring to said auxiliary conversion means, said dot matrix conversion means and said non-dot matrix conversion means in this sequential order in the conversion of code data.

According to another aspect of the present invention is provided an output apparatus provided therein with a dot matrix data memory unit and a non-dot matrix data memory unit, and an auxiliary memory unit connectable to said apparatus, wherein a desired dot matrix pattern is formed utilizing said auxiliary memory unit, said dot matrix data memory unit and said non-dot matrix data memory unit in this order of preference.

According to another aspect of the present invention is provided an output apparatus having a dot matrix data memory unit, a non-dot matrix data memory unit and an auxiliary memory unit, wherein the pattern generation in response to input code is executed by referring to said auxiliary memory unit, said dot matrix data memory unit and said non-dot matrix data memory unit in this sequential order.

These and other objects, features and advantages of the present invention will be more fully appreciated from a consideration of the following detailed description of the preferred embodiments, taken in conjunction with the accompanying drawings.

DETAILED DESCRIPTION OF THE PREFERRED EMBODIMENTS

Now the present invention will be clarified in detail by reference to the preferred embodiments thereof, shown in the attached drawings.

Figure 1:
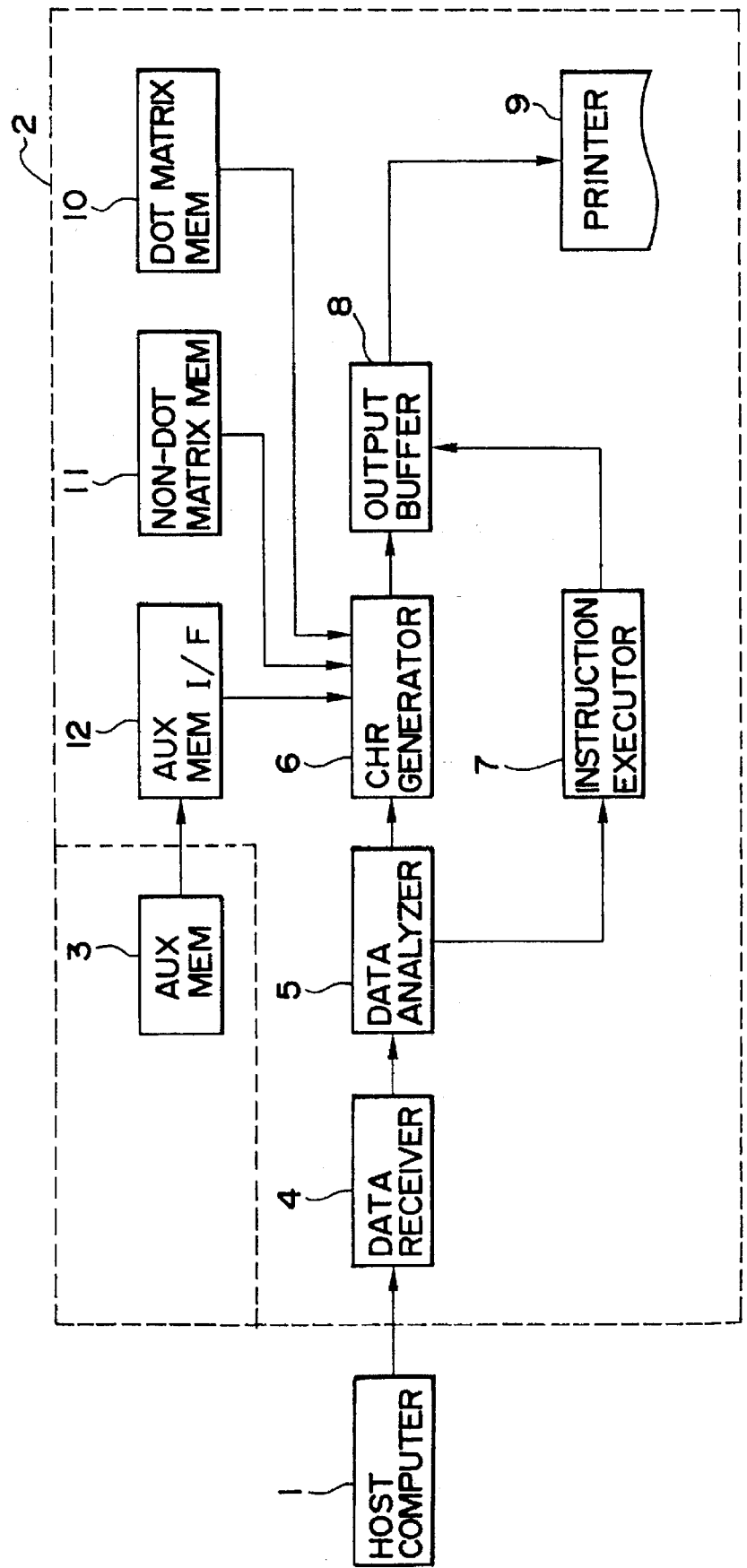
FIG. 1 is a block diagram of a printing apparatus constituting an embodiment of the present invention.

FIG. 1 is a block diagram of a printing apparatus constituting an embodiment of the present invention, wherein are shown an external host computer 1 for releasing edited text data; a main body 2 of the printing apparatus; an auxiliary memory unit 3 detachable from the main body 2 and serving to store dot matrix data corresponding to character data; a data receiver unit 4 for receiving the text data (code data) from the host computer 1 and storing said data in an unrepresented buffer; and a data analyzer 5 for analyzing whether the received code data are character data or other control data. A character pattern generator 6 generates dot matrix pattern data corresponding to character data, either by direct generation of dot matrix pattern data by referring the text data to a dot matrix character memory unit 10 or the auxiliary memory unit 3, or by indirect conversion of said code data into vector data or run-length data by referring said code data to the non-dot matrix character memory unit 11 followed by a conversion into dot matrix pattern data by calculation. An instruction execution unit 7 executes control, for example in response to a line feed code, for an output buffer 8 and a printer unit 9. The output buffer 8 stores a group of font data developed into a pattern, in the form of a bit map. The printer unit prints the contents of the output buffer 8.

A dot matrix character memory unit 10, consisting of a ROM or a RAM, stores dot matrix data corresponding to character data. A non-dot matrix character memory unit 11 stores vector data or run-length data corresponding to the character data. An auxiliary memory interface 12 serves to read the dot matrix data corresponding to the character data, from the mounted auxiliary memory 3.

Figure 2:
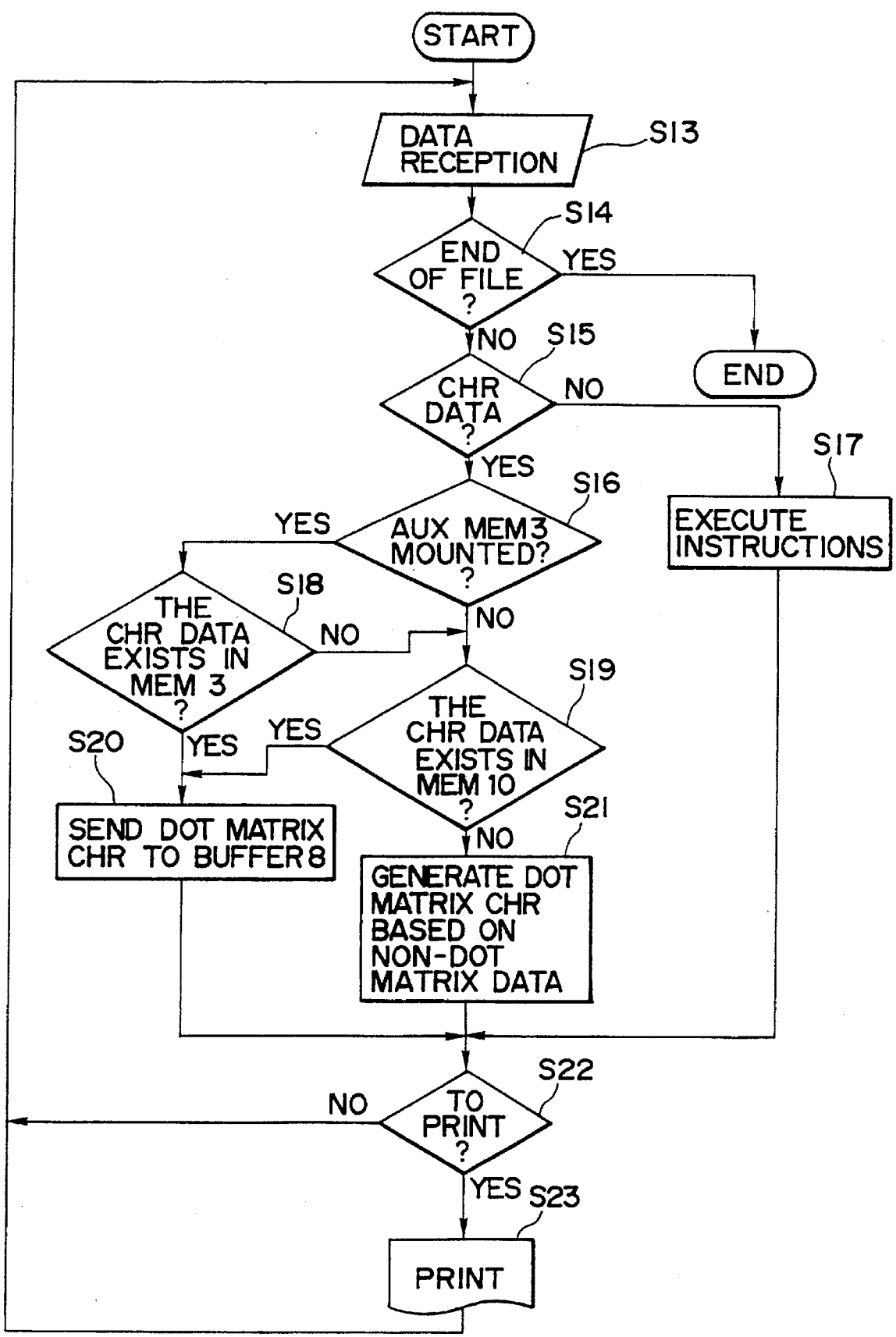
FIG. 2 is a flow chart of a printing sequence of said embodiment.

FIG. 2 is a flow chart of the printing sequence of the present embodiment. In this sequence, a step S13 receives the text data from the host computer. A step S14 discriminates whether the text data have been completed (end of file), and, if completed, the sequence is terminated. If not complete, the sequence proceeds to a step S15 for discriminating whether said data are character data. If so, the sequence proceeds to a step S16 for discriminating whether the auxiliary memory 3 is mounted, for example by a signal from a connecting pin. If it is mounted, a step S18 analyzes said character data. If there are corresponding dot matrix data, a step S20 develops the dot matrix data obtained from the auxiliary memory 3 in the output buffer 8. On the other hand, if the step S18 identifies the absence of the corresponding dot matrix data, the sequence proceeds to a step S19 for referring said character data to the internal dot matrix character memory 10. In the presence of the corresponding dot matrix data, the sequence proceeds to the step S20 for developing the dot matrix data, obtained from the dot matrix character memory 10, in the output buffer 8. In the absence of said corresponding dot matrix data, the sequence proceeds to a step S21 for referring said character data to the non-dot matrix character memory 11, then reads the corresponding vector or run-length data, converts said data into dot matrix data by calculation, and develops said dot matrix data in the output buffer 8. A step S22 discriminates whether a printing operation is requested, and if requested, the printing operation is executed in a step S23. Otherwise the sequence returns to the step S13 for awaiting next data reception. Also, if the step S15 does not identify character data, the sequence proceeds to a step S17 for executing the content of the instruction code.

The above-explained control sequence enables high-speed printing in general, since the priority is given to the direct dot matrix conversion.

Also the number of characters can be increased as the dot matrix data can be supplied from the auxiliary memory, and the ROM or RAM in the main body can still be of a limited capacity.

Also, as the code data are referred to the auxiliary conversion means, dot matrix conversion means and non-dot matrix conversion means in this order, a major part of the accesses is made to the auxiliary conversion means so that high-speed printing can be achieved even if the ROM or RAM in the main body is of a limited capacity. It is also possible to constitute the auxiliary memory 3 with an internal RAM and to enable loading of a desired font from the outside. Such font is temporarily stored, separately from the internal fonts. Also, it is possible to alter the order of the steps S16, S19 and S21 according to an instruction from manual host computer or from the keys.

Another Embodiment

In another embodiment, the dot matrix character memory 10 is composed of a high-speed cache memory (not shown). If the same dot matrix data are present both in the auxiliary memory 3 and the cache memory (i.e., there is an overlap of data between those memories), said data are deleted from the cache memory and the evacuated area is used for registering other necessary dot matrix data (preferably those formed by the non-dot matrix character memory 11).

Figure 3:
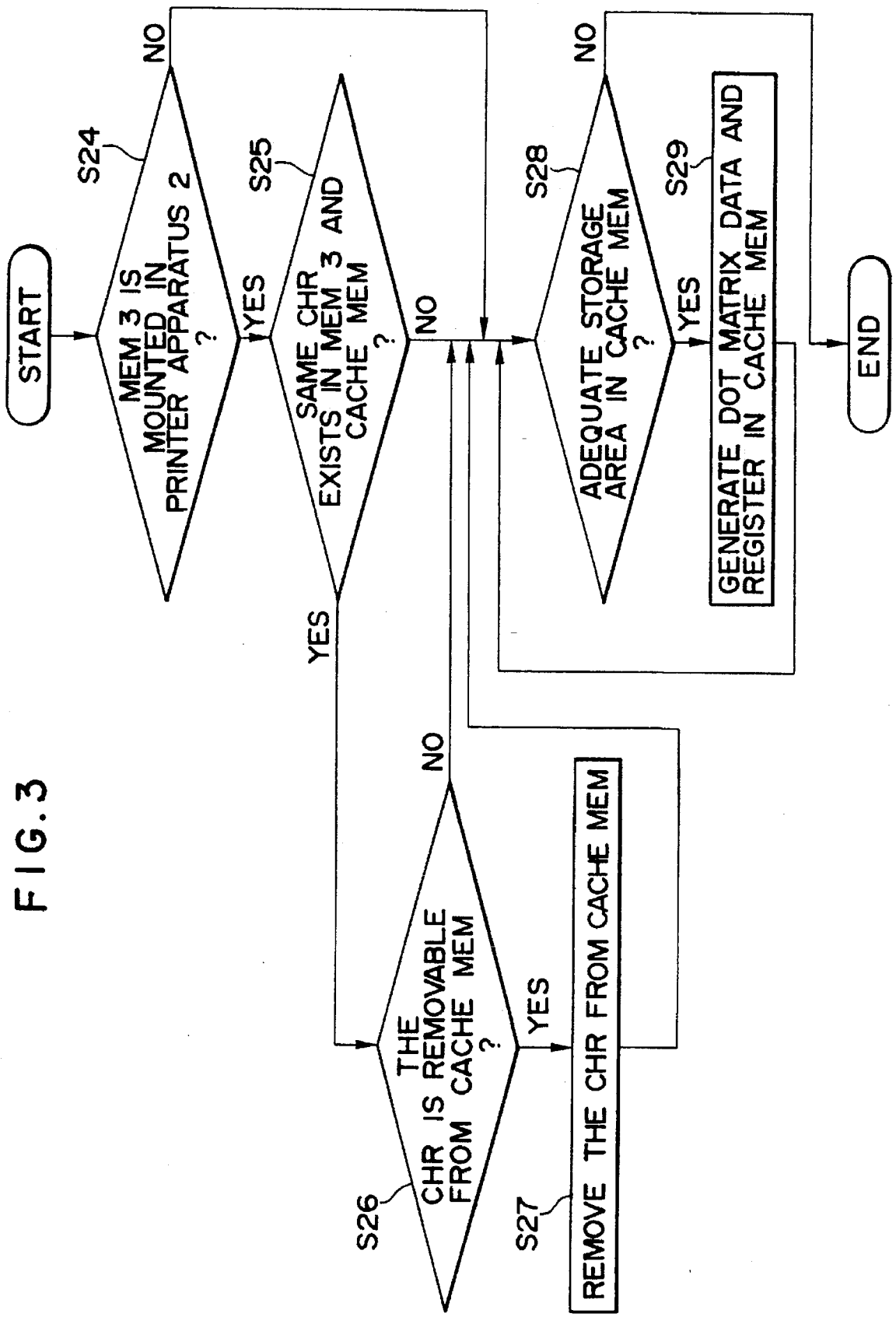
FIG. 3 is a flow chart of a sequence utilizing dot matrix data in another embodiment.

FIG. 3 is a flow chart of a control sequence for utilizing the dot matrix data in said other embodiment. A step S24 discriminates whether the auxiliary memory 3 is mounted on the main body 2, and, if not, the sequence proceeds to a step S28. If it is mounted, the sequence proceeds to a step S25 for discriminating the presence of overlapping dot matrix data in the auxiliary memory 3 and the cache memory in the dot matrix character memory 10. The overlapping can be easily identified for example by a type code (font set code) attached to the auxiliary memory 3. In the absence of overlapping the sequence proceeds to a step S28. In the presence of overlapping, the sequence proceeds to a step S26 for discriminating whether the overlapping dot matrix data can be deleted from the cache memory. Said discrimination can be made by a deletion-inhibiting signal attached in advance by the user to a desired type code in the cache memory. If said data are deletable, a step S27 deletes said dot matrix data from the cache memory. A step S28 then secures the empty area in the cache memory, and, upon said securing, a step S29 generates the dot matrix data of necessary character codes by means of the non-dot matrix character memory 11, and registers said data in the cache memory.

In the above-explained sequence, many characters can be stored in the form of dot matrix data available for high-speed processing.

Also the size of the cache memory can be reduced by storing the dot matrix data for the cache memory in advance in the auxiliary memory 3. It is possible to use only one auxiliary memory 3 or several interchangeable auxiliary memories.

As explained in the foregoing, the present invention enables high-speed processing, since priority is given to data generation from the dot matrix character memory. Also, the memory capacity of the entire apparatus can be reduced as the conversion from the non-dot matrix is employed in combination.

Furthermore, since the auxiliary memory is interchangeable, it is possible to reduce the memory capacity in the main body, and to provide characters of many variations.

In the foregoing description the auxiliary memory 3 is externally connectable to the main body of the apparatus, but it is also possible to constitute said auxiliary memory 3 with an internal RAM and to supply necessary fonts from the outside.

The foregoing description is based on an assumption that the properties of data such as style or size are equivalent to the different memories.

In this manner the present invention enables one to obtain an output apparatus provided therein with a dot matrix data memory, a non-dot matrix data memory and an auxiliary memory, in which the pattern generation in response to input codes is conducted by reference to said auxiliary memory, said dot matrix data memory and said non-dot matrix data memory in this sequential order.

Also the present invention enables one to obtain an output apparatus capable, in case a pattern exists in overlapping manner in a cache memory defined in a dot font memory and in an auxiliary dot font memory, both provided in the apparatus, of deleting such overlapping pattern in said cache memory.

What is claimed is:

1. An output apparatus comprising:
   code data memory means for storing code data received from outside the apparatus;
   first dot matrix data memory means for storing dot matrix data for converting the code data stored in said code data memory means into dot matrix data;
   connecting means for detachably connecting a second dot matrix data memory means for storing dot matrix data for converting code data into dot matrix data to said apparatus;
   non-dot-matrix data memory means for storing non-dot matrix data for converting the code data stored in said code data memory means into non-dot-matrix data and then into dot matrix data; and
   conversion control means for referring the code data to the second dot matrix data memory means, said first dot matrix data memory means and said non-dot-matrix data memory means in this sequential order to obtain a desired dot pattern.

2. An output apparatus comprising:
   code data memory means for storing code data received from outside the apparatus;
   first dot matrix data memory means for storing dot matrix data for converting the code data stored in said code data memory means into dot matrix data;
   connecting means for detachably connecting a second dot matrix data memory means for storing dot matrix data for converting code data into dot matrix data to said apparatus;
   non-dot-matrix data memory means for storing non-dot-matrix data for converting the code data stored in said code data memory means into non-dot-matrix data and then into dot matrix data;

conversion control means for controlling the second dot matrix data memory means, said first dot matrix data memory means and said non-dot-matrix data memory means to have priority in this sequential order upon conversion of code data into dot matrix data; and discrimination means for discriminating whether the second dot matrix data memory means is connected to said apparatus, wherein said conversion control means controls said first dot matrix data memory means and said non-dot-matrix data memory means to have priority in this sequential order when the second dot matrix data memory means is identified as unconnected by said discrimination means.

3. An output apparatus comprising:

code data memory means for storing code data received from outside the apparatus;

first dot matrix data memory means for temporarily storing dot matrix data for converting the code data stored in said code data memory means into dot matrix data;

second dot matrix data memory means for storing dot matrix data for converting the code data stored in said code data memory means into dot matrix data;

discrimination means for discriminating the presence of overlapping matrix data which is stored both in said first dot matrix data memory means and in said second dot matrix data memory means; and memory control means for judging whether or not the overlapping matrix data can be deleted and for deleting the overlapping matrix data from said first dot matrix data memory means when judgment shows that data can be deleted, based on the result of discrimination by said discrimination means.

4. An output apparatus comprising:

code data memory means for storing code data received from outside the apparatus;

first dot matrix data memory means for temporarily storing dot matrix data for converting the code data stored in said code data memory means into dot matrix data;

second dot matrix data memory means for storing dot matrix data for converting the code data stored in said code data memory means into dot matrix data;

discrimination means for discriminating the presence of overlapping matrix data which is stored both in said first dot matrix data memory means and in said second dot matrix data memory means; and memory control means for deleting the overlapping matrix data from said first dot matrix data memory means based on the result of discrimination by said discrimination means, wherein said second dot matrix data memory means stores a download font externally entered.

5. An apparatus according to claim 3, further comprising non-dot matrix data memory means for storing non-dot matrix data for converting code data into non-dot matrix data and then into dot matrix data, wherein said first dot matrix data memory means temporarily stores dot matrix data obtained by conversion from non-dot matrix data stored in said non-dot matrix data memory means.

6. An apparatus according to claim 3, wherein said second dot matrix data memory means is detachably mountable to the apparatus.

7. An apparatus according to claim 3, wherein said first dot matrix data memory means is composed of a part of a dot font memory provided in the apparatus.

8. An output method applicable to an apparatus including:

code data memory for storing code data received from outside the apparatus;

a first dot matrix data memory for storing dot matrix data for converting the code data stored in the code data memory into dot matrix data;

connecting means for detachably connecting a second dot matrix data memory for storing dot matrix data for converting the code data stored in the code data memory into dot matrix data to the apparatus; and a non-dot-matrix data memory for storing non-dot-matrix data for converting the code data stored in the code data memory into non-dot-matrix data and then into dot matrix data, said method comprising the steps of:

receiving the code data; and controlling the second dot matrix data memory, the first dot matrix data memory and the non-dot-matrix data memory to have priority in this sequential order to obtain a desired dot pattern in response to the code data received in said receiving step.

9. An output method applicable to an apparatus including:

code data memory for storing code data received from outside the apparatus;

a first dot matrix data memory for storing dot matrix data for converting the code data stored in the code data memory into dot matrix data;

connecting means for detachably connecting a second dot matrix data memory for storing dot matrix data for converting the code data stored in the code data memory into dot matrix data to the apparatus; and a non-dot-matrix data memory for storing non-dot-matrix data for converting the code data stored in the code data memory into non-dot-matrix data and then into dot matrix data;

said method comprising the steps of:

controlling the second dot matrix data memory, the first dot matrix data memory and the non-dot-matrix data memory to have priority in this sequential order to obtain a desired dot pattern; and discriminating whether the second dot matrix data memory is detached from the apparatus, controlling the first dot matrix data memory and the non-dot-matrix data memory to have priority in this sequential order when the second dot matrix data memory is identified as detached in said discriminating step.

10. An output method applicable to an apparatus including:

code data memory for storing code data received from outside the apparatus;

a first dot matrix data memory for temporarily storing dot matrix data for converting the code data stored in the code data memory into dot matrix data; and a second dot matrix data memory for storing dot matrix data for converting the code data stored in the code data memory into dot matrix data;

said method comprising the steps of:

discriminating the presence of overlapping matrix data which is stored both in the first dot matrix data memory and in the second dot matrix data memory; and judging whether or not the overlapping matrix data can be deleted and for deleting the overlapping matrix data from the first dot matrix data memory when judgment shows that data can be deleted, based on the result of said discriminating step.

11. An output method applicable to an apparatus including:

code data memory for storing code data received from outside the apparatus;

a first dot matrix data memory for temporarily storing dot matrix data for converting the code data stored in the code data memory into dot matrix data; and a second dot matrix data memory for storing dot matrix data for converting the code data stored in the code data memory into dot matrix data;

said method comprising the steps of:

discriminating the presence of overlapping matrix data which is stored both in the first dot matrix data memory and in the second dot matrix data memory; and judging whether or not the overlapping matrix data can be deleted and for deleting the overlapping matrix data from the first matrix data memory when judgment shows that data can be deleted, based on the result of said discriminating step, wherein the second dot matrix data memory temporarily stores a download font externally entered.

12. A method according to claim 10, further comprising the step of storing non-dot matrix data for converting code data into non-dot matrix data and then into dot matrix data in a non-dot matrix data memory, wherein the first dot matrix data memory temporarily stores dot matrix data obtained by conversion from non-dot matrix data stored in the non-dot matrix data memory.

13. A method according to claim 11, wherein the second dot matrix data memory is detachably mountable.

14. A method according to claim 11, wherein the first dot matrix data memory is composed of a part of a dot font memory.

15. An output apparatus comprising:

code data memory means for storing code data received from outside the apparatus;

connecting means for detachably connecting dot matrix data memory means for storing dot matrix data for converting the code data stored in said code data memory means into dot matrix data to said apparatus;

non-dot-matrix data memory means for storing non-dot-matrix data for converting the code data stored in said code data memory means into non-dot-matrix data and then into dot matrix data; and conversion control means for controlling the dot matrix data memory means and said non-dot-matrix data memory means to have priority in this sequential order upon conversion of the code data into dot matrix data.

16. An output apparatus comprising:

code data memory means for storing code data received from outside the apparatus;

dot matrix data memory means for storing dot matrix data for converting the code data stored in said code data memory means into dot matrix data;

non-dot-matrix data memory means for storing non-dot-matrix data for converting the code data stored in said code data memory means into non-dot-matrix data and then into dot matrix data; and conversion control means for controlling said dot matrix data memory means and said non-dot-matrix data memory means to have priority in this sequential order upon conversion of the code data into dot matrix data.

17. An output apparatus comprising:

code data memory means for storing code data received from outside the apparatus;

first dot matrix data memory means for storing dot matrix data for converting the code data stored in said code data memory means into dot matrix data;

connecting means for detachably connecting a second dot matrix data memory means for storing dot matrix data for converting the code data stored in said code data memory means into dot matrix data to said apparatus;

non-dot-matrix data memory means for storing non-dot-matrix data for converting the code data stored in said code data memory means into non-dot-matrix data and then into dot matrix data; and conversion control means for controlling at least the second dot matrix data memory means and said non-dot-matrix data memory means to have priority in this sequential order upon conversion of the code data into dot matrix data.

18. An output apparatus comprising:

code data memory means for storing code data received from outside the apparatus;

dot matrix data memory means for storing dot matrix data for converting the code data stored in said code data memory means into dot matrix data, said dot matrix data memory means storing a download font externally entered;

non-dot-matrix data memory means for storing non-dot-matrix data for converting the code data stored in said code data memory means into non-dot-matrix data and then into dot matrix data; and conversion control means for controlling said dot matrix data memory means and said non-dot-matrix data memory means to have priority in this sequential order upon conversion of the code data into dot matrix data.

19. An output apparatus comprising:

code data memory means for storing code data received from outside the apparatus;

first dot matrix data memory means for storing dot matrix data for converting the code data stored in said code data memory means into dot matrix data;

second dot matrix data memory means for storing dot matrix data for converting the code data stored in said code data memory means into dot matrix data, said second dot matrix data memory means storing a download font externally entered;

non-dot-matrix data memory means for storing non-dot-matrix data for converting the code data stored in said code data memory means into non-dot-matrix data and then into dot matrix data; and conversion control means for controlling at least said second dot matrix data memory means and said non-dot-matrix data memory means to have priority in this sequential order upon conversion of the code data into dot matrix data.

20. An output apparatus comprising:

code data memory means for storing code data received from outside the apparatus;

first dot matrix data memory means for storing dot matrix data for converting the code data stored in said code data memory means into dot matrix data;

connecting means for detachably connecting a second dot matrix data memory means for storing dot matrix data for converting the code data stored in said code data memory means into dot matrix data to said apparatus;

non-dot-matrix data memory means for storing non-dot-matrix data for converting the code data stored in said code data memory means into non-dot-matrix data and then into dot matrix data;

conversion control means for controlling the second dot matrix data memory means, said first dot matrix data memory means and said non-dot-matrix data memory means to have priority in this sequential order upon conversion of the code data into dot matrix data; and discrimination means for discriminating whether the second dot matrix data memory means is connected to said apparatus, wherein said conversion control means controls the second dot matrix data memory means, first dot matrix data memory means and said non-dot-matrix data memory means to have priority in this sequential order when the second dot matrix data memory means is identified as connected by said discrimination means upon obtaining a desired dot pattern.

21. An output apparatus comprising:

code data memory means for storing code data received from outside the apparatus;

first dot matrix data memory means for storing dot matrix data for converting the code data stored in said code data memory means into dot matrix data;

second dot matrix data memory means for storing dot matrix data for converting the code data stored in said code data memory means into dot matrix data and storing a download font externally entered;

non-dot-matrix data memory means for storing non-dot matrix data for converting the code data stored in said code data memory means into non-dot-matrix data and then into dot matrix data; and conversion control means for referring the code data to the second dot matrix data memory means, said first dot matrix data memory means and said non-dot-matrix data memory means in this sequential order to obtain a desired dot pattern.

22. A method according to claim 10, wherein the second dot matrix data memory is detachably mounted.

23. A method according to claim 10, wherein the first dot matrix data memory is composed of a part of a dot font memory.

24. An apparatus according claim 1, 2, 3, 4, 15, 16, 17, 18, 19, 20 or 21, further comprising interface means for receiving code data from the exterior, wherein said interface means judges whether the code data is a control instruction or not.

25. An apparatus according to claim 1, 2, 4, 15, 16, 17, 18, 19, 20 or 21, wherein the non-dot-matrix data comprises vector data or run-length data.

26. An apparatus according to claim 1, 2, 3, 4, 15, 17, 19 or 21, further comprising connecting means for connecting said second dot matrix data memory means to said apparatus.

27. An apparatus according to claim 1, 2, 4, 15, 16, 17, 18, 19, 20 or 21, further comprising means for generating information for instructing said conversion control means to change the priority.

28. An apparatus according to claim 1, 2, 3, 4, 15, 17, 20 or 21, wherein said apparatus includes a plurality of said second dot matrix data memory means which can each be selectively connected to said apparatus.

29. An apparatus according to claim 1, 2, 17, 19, 20 or 21, wherein said first dot matrix data memory means is a part of a dot font memory.

30. An apparatus according to claim 1, 2, 17, 19, 20 or 21, wherein said first dot matrix data memory means comprises a ROM.

31. An apparatus according to claim 1, 2, 3, 14, 15, 16, 17, 18, 19, 20 or 21, further comprising means for storing the code data and means for storing the dot pattern.

32. An apparatus according to claim 3 or 4, wherein said second dot matrix data memory means comprises a dot font memory.

33. An apparatus according to claim 3, wherein said discrimination means discriminates the presence of the overlapping matrix data by checking type code attached to said second dot matrix data memory means.

34. An apparatus according to claim 16, wherein said dot matrix data memory means is a part of a dot font memory.

35. An apparatus according to claim 16, wherein said dot matrix data memory means comprises a ROM.

36. An apparatus according to claim 18, further comprising connecting means for connecting said dot matrix data memory means to said apparatus.

37. An apparatus according to claim 18, wherein said dot matrix data memory means is a part of a dot font memory.

38. An apparatus according to claim 18, wherein said dot matrix data memory means comprises a ROM.

39. An output method applicable to an apparatus including:

code data memory for storing code data received from outside the apparatus;

connecting means for detachably connecting a dot matrix data memory for storing dot matrix data for converting the code data stored in the code data memory into dot matrix data to the apparatus;

a non-dot-matrix memory for storing non-dot-matrix data for converting the code data stored in the code data memory into non-dot-matrix data and then into dot matrix data;

said method comprising the steps of:
receiving code data; and
controlling the dot matrix data memory and the non-dot-matrix data memory to have priority in this sequential order upon conversion of the code data into dot matrix data to obtain a desired dot pattern in response to the code data received in said receiving step.

40. An output method applicable to an apparatus including:

code data memory for storing code data received from outside the apparatus;

a dot-matrix memory for storing dot matrix data for converting the code data stored in the code data memory into dot matrix data; and a non-dot-matrix memory for storing non-dot-matrix data for converting the code data stored in the code data memory into non-dot-matrix data and then into dot matrix data;

said method comprising the steps of:
receiving the code data; and
controlling the dot matrix data memory and the non-dot-matrix data memory to have priority in this sequential order upon conversion of the code data into dot matrix data to obtain a desired dot pattern in response to the code data received in said receiving step.

41. An output method applicable to an apparatus including:

code data memory for storing code data received from outside the apparatus;

a first dot matrix data memory for storing first dot matrix data for converting the code data stored in the code data memory into dot matrix data;

connecting means for detachably connecting a second dot matrix data memory for storing second dot matrix data for converting the code data stored in the code data memory into dot matrix data to the apparatus; and a non-dot-matrix data memory for storing non-dot-matrix data for converting the code data stored in the code data memory into non-dot-matrix data and then into dot matrix data;

said method comprising the steps of:

receiving the code data; and controlling at least the second dot matrix data memory and the non-dot-matrix data memory to have priority in this sequential order upon conversion of the code data into dot matrix data to obtain a desired dot pattern in response to the code data received in said receiving step.

42. An output method applicable to an apparatus including:

code data memory for storing code data received from outside the apparatus;

a dot matrix data memory storing a download font externally entered, for storing dot matrix data for converting the code data stored in the code data memory into dot matrix data; and a non-dot-matrix data memory for storing non-dot-matrix data for converting the code data stored in the code data memory into non-dot-matrix data and then into dot matrix data;

said method comprising the steps of:

receiving the code data; and controlling the dot matrix data memory and the non-dot-matrix data memory to have priority in this sequential order upon conversion of the code data into dot matrix data to obtain a desired dot pattern in response to the code data received in said receiving step.

43. An output method applicable to an apparatus including:

code data memory for storing code data received from outside the apparatus;

a first dot matrix data memory for storing first dot matrix data for converting the code data stored in the code data memory into dot matrix data;

a second dot matrix data memory storing a download font externally entered, for storing second dot matrix data for converting the code data stored in the code data memory into dot matrix data; and a non-dot-matrix data memory for storing non-dot-matrix data for converting the code data stored in the code data memory into non-dot-matrix data and then into dot matrix data;

said method comprising the steps of:

receiving the code data; and controlling at least the second dot matrix data memory and the non-dot-matrix data memory to have priority in this sequential order upon conversion of the code data into dot matrix data to obtain a desired dot pattern in response to the code data received in said receiving step.

44. An output method applicable to an apparatus including:

code data memory for storing code data received from outside the apparatus;

a first dot matrix data memory for storing first dot matrix data for converting the code data stored in the code data memory into dot matrix data;

connecting means for connecting a second dot matrix data memory for storing second dot matrix data for converting the code data stored in the code data memory into dot matrix data to the apparatus; and a non-dot-matrix data memory for storing non-dot-matrix data memory for converting the code data stored in the code data memory into non-dot-matrix data and then into dot matrix data;

said method comprising the steps of:

controlling the second dot matrix data memory, the first dot matrix data memory and the non-dot-matrix data memory to have priority in this sequential order upon conversion of the code data into dot matrix data; and discriminating whether the second dot matrix data memory is connected to the apparatus, wherein the second dot matrix data memory, first dot matrix data memory and the non-dot-matrix data memory are controlled to have priority in this sequential order, when the second dot matrix data memory means is identified as connected in said discrimination step, to obtain a desired dot pattern.

45. An output method applicable to an apparatus including:

code data memory for storing code data received from outside the apparatus;

a first dot matrix data memory for storing dot matrix data for converting the code data stored in the code data memory into dot matrix data;

a second dot matrix data memory, the second dot matrix data memory storing a download font externally entered, for storing dot matrix data for converting the code data stored in the code data memory into dot matrix data; and a non-dot-matrix data memory for storing non-dot-matrix data for converting the code data stored in the code data memory into non-dot-matrix data and then into dot matrix data;

said method comprising the steps of:

receiving the code data; and controlling the second dot matrix data memory, the first dot matrix data memory and the non-dot-matrix data memory to have priority in this sequential order to obtain a desired dot pattern in response to the code data received in said receiving step.

46. An output method applicable to an apparatus including:

code data memory for storing code data received from outside the apparatus;

a first dot matrix data memory for temporarily storing dot matrix data for converting the code data stored in the code data memory into dot matrix data; and a second dot matrix data memory for storing dot matrix data for converting the code data stored in the code data memory into dot matrix data;

said method comprising the steps of:

discriminating the presence of overlapping matrix data which is stored both in the first dot matrix data memory and in the second dot matrix data memory; and deleting the overlapping matrix data from the first dot matrix data memory based on the result of the discrimination, wherein the second dot matrix data memory stores a download font externally entered.

47. An output method applicable to an apparatus including:
    code data memory for storing code data received from outside the apparatus;
    a first dot matrix data memory for temporarily storing dot matrix data for converting the code data stored in the code data memory into dot matrix data;
    a second dot matrix data memory for storing dot matrix data for converting the code data stored in the code data memory into dot matrix data;
    said method comprising the steps of:
        discriminating the presence of overlapping matrix data which is stored both in the first dot matrix data memory and in the second dot matrix data memory; and
        deleting the overlapping matrix data from the first dot matrix data memory based on the result of discrimination.

48. A method according to claim 8, 9, 10, 11, 39, 41, 42, 43, 44 or 46, further comprising the step of receiving code data from the exterior, and judging whether the code data is a control instruction or not.

49. A method according to claim 8, 9, 11, 39, 40, 41, 42, 43 or 45, wherein the non-dot-matrix data comprises vector data or run-length data.

50. A method according to claim 8, 9, 11, 40, 41, 42, 43, or 45 further comprising the step of generating information for instructing a change in priority.

51. A method according to claim 10, wherein, in said discrimination step, the presence of the overlapping matrix data is discriminated by checking type code attached to the second dot matrix data memory means.

52. An output method according to claim 41, 42, 43, 44 or 45, wherein the apparatus further comprises interface means for receiving code data from the exterior, wherein the interface means judges whether the code data is a control instruction or not.

53. An output method according to claim 41, 42, 43, 44 or 45, wherein the non-dot-matrix data of the apparatus comprises vector data or run-length data.

54. An output method according to claim 41, 43, 44 or 45, wherein the apparatus further comprises connecting means for connecting the second dot matrix data memory means to the apparatus.

55. An output method according to claim 41, 42, 43, 44 or 45, wherein the apparatus further comprises means for generating information for instruction the conversion control means to change the priority.

56. An output method according to claim 41, 44 or 45, wherein the apparatus includes a plurality of the second dot matrix data memory means which can each be selectively connected to the apparatus.

57. An output method according to claim 41, 43, 44 or 45, wherein the first dot matrix data memory means of the apparatus is a part of a dot font memory.

58. An output method according to claim 41, 43, 44 or 45, wherein the first dot matrix data memory means of the apparatus comprises a ROM.

59. An output method according to claim 41, 42, 43, 44 or 45, wherein the apparatus further comprises means for storing the code data and means for storing the dot pattern.

60. An output method according to claim 42, wherein the apparatus further comprises connecting means for connecting the dot matrix data memory means to the apparatus.

61. An output method according to claim 42, wherein the dot matrix data memory means of the apparatus is a part of a dot font memory.

62. An output method according to claim 42, wherein the dot matrix data memory means of the apparatus comprises a ROM.

63. An output apparatus comprising:
    code data memory for storing code data received from outside the apparatus;
    a first dot matrix data memory for temporarily storing dot matrix data for converting the code data stored in the code data memory into dot matrix data;
    a second dot matrix data memory for storing dot matrix data for converting the code data stored in the code data memory into dot matrix data;
    discriminating means for discriminating the presence of overlapping matrix data which is stored both in the first dot matrix data memory and in the second dot matrix data memory; and
    deleting means for deleting the overlapping matrix data from the first dot matrix data memory based on the result of discrimination.

64. An output apparatus according to claim 63, wherein said second dot matrix data memory stores a downloaded font externally entered.

* * * * *

UNITED STATES PATENT AND TRADEMARK OFFICE
CERTIFICATE OF CORRECTION

PATENT NO. : 5,630,031

DATED : May 13, 1997

INVENTOR(S): TSUNEAKI KURUMIDA

Page 1 of 2

It is certified that error appears in the above-identified patent and that said Letters Patent is hereby corrected as shown below:

COLUMN 1
 Line 16, "particularly" should read --particular--.

COLUMN 2
 Line 52, "complete," should read --completed,--.

COLUMN 3
 Line 12, "the priority" should read --priority--;
 Line 14, "Also" should read --Also,--;
 Line 30, "manual" should read --the-- and "the" should read --manual--;
 Line 66, "Also" should read --Also,--.

COLUMN 4
 Line 29, "Also" should read --Also,--;
 Line 46, "non-dot" should read --non-dot---.

COLUMN 7
 Line 23, "first" should read --first dot--.

COLUMN 9
 Line 31, "non-dot" should read --non-dot---;
 Line 46, "according" should read --according to--.

UNITED STATES PATENT AND TRADEMARK OFFICE
CERTIFICATE OF CORRECTION

PATENT NO. : 5,630,031

DATED : May 13, 1997

INVENTOR(S): TSUNEAKI KURUMIDA

It is certified that error appears in the above-identified patent and that said Letters Patent is hereby corrected as shown below:

<u>COLUMN 12</u>
  Line 9, "memory" should be deleted;
  Line 23, "means" should be deleted.

<u>COLUMN 13</u>
  Line 21, "39," should read --39, 40,--;
  Line 22, "44 or 46," should read --or 45,--;
  Line 29, "45" should read --45,--.

<u>COLUMN 14</u>
  Line 3, "instruction" should read --instructing--.

Signed and Sealed this

Eleventh Day of November, 1997

Attest:

BRUCE LEHMAN

*Attesting Officer*   Commissioner of Patents and Trademarks